US011952772B2

(12) United States Patent
Himmler, Sr.

(10) Patent No.: US 11,952,772 B2
(45) Date of Patent: Apr. 9, 2024

(54) SYSTEM AND METHOD FOR BUILDING A MODULAR BASED PARTITION

(71) Applicant: Kenneth Himmler, Sr., Lakewood Ranch, FL (US)

(72) Inventor: Kenneth Himmler, Sr., Lakewood Ranch, FL (US)

( * ) Notice: Subject to any disclaimer, the term of this patent is extended or adjusted under 35 U.S.C. 154(b) by 165 days.

(21) Appl. No.: 17/385,080

(22) Filed: Jul. 26, 2021

(65) Prior Publication Data

US 2022/0034087 A1 Feb. 3, 2022

Related U.S. Application Data

(60) Provisional application No. 63/057,342, filed on Jul. 28, 2020.

(51) Int. Cl.
*E04B 2/74* (2006.01)
*B43L 1/00* (2006.01)
(Continued)

(52) U.S. Cl.
CPC .............. *E04B 2/7424* (2013.01); *B43L 1/00* (2013.01); *E04B 2/7425* (2013.01); *F21S 8/033* (2013.01);
(Continued)

(58) Field of Classification Search
CPC ................. E04B 2/7424; E04B 2/7425; E04B 2002/7488; F21S 8/033
(Continued)

(56) References Cited

U.S. PATENT DOCUMENTS 4,296,579 A * 10/1981 Proud .................... E04B 2/7427 52/36.5
4,535,577 A * 8/1985 Tenser .................. E04B 2/7429 174/495
(Continued)

FOREIGN PATENT DOCUMENTS

CA 2668445 A1 * 12/2010 ........... E04B 2/7425
DE 102012108296 A1 * 3/2014 ............... E04B 1/86
(Continued)

OTHER PUBLICATIONS

"Office Walls & Partitions," Everblocksystems.com. https://www.everblocksystems.com/office-walls-partitions/ [date accessed: May 30, 2021].

*Primary Examiner* — Babajide A Demuren
(74) *Attorney, Agent, or Firm* — Bold IP, PLLC

(57) ABSTRACT

A partition wall usable in any residential or work environment is described having modules that can be customized to create a partition wall that best suits the needs of the user. The modules that make up the partition wall can be made from a single frame structure or multiple frame components that connect together to form generally rectangular or square like modules or building blocks that form the partition wall. The modules can connect to any adjacent module on each side or top or bottom. The modules are assembled into the requisite number of rows and columns to form the partition wall at the desired width and height. The modules include electrical contacts to provide electrical power to one or more add on pieces that require power to function, including, fans and light panels. Further, sound batting can be added, and decorative panels to provide an aesthetically pleasing appearance.

19 Claims, 14 Drawing Sheets

(51) Int. Cl.
*F21S 8/00* (2006.01)
*F24F 7/013* (2006.01)

(52) U.S. Cl.
CPC ...... *F24F 7/013* (2013.01); *E04B 2002/7488* (2013.01)

(58) Field of Classification Search
USPC .................................. 52/483.1, 481.1, 481.2
See application file for complete search history.

(56) References Cited

U.S. PATENT DOCUMENTS

| | | | | | |
|---|---|---|---|---|---|
| 4,876,835 | A * | 10/1989 | Kelley | E04B 2/7425 | 211/208 |
| 4,914,873 | A * | 4/1990 | Newhouse | A47B 13/021 | 52/79.9 |
| 5,175,969 | A * | 1/1993 | Knauf | E04B 2/7422 | 52/239 |
| 5,806,258 | A * | 9/1998 | Miedema | E04B 2/7437 | 52/239 |
| 6,883,277 | B2 * | 4/2005 | Wiechecki | E04B 2/824 | 52/36.5 |
| 7,210,270 | B1 * | 5/2007 | King | H02G 3/0425 | 52/239 |
| 7,913,459 | B2 | 3/2011 | Ball et al. | | |
| 8,327,589 | B2 | 12/2012 | Sutton et al. | | |
| 9,003,731 | B2 * | 4/2015 | Gosling | E04B 2/7435 | 52/239 |
| 2002/0189180 | A1 * | 12/2002 | King | E04B 2/7422 | 52/243 |
| 2004/0020137 | A1 * | 2/2004 | Battey | E04B 2/7425 | 52/220.7 |
| 2004/0177573 | A1 * | 9/2004 | Newhouse | E04B 2/7425 | 52/239 |
| 2005/0005549 | A1 * | 1/2005 | Peter | E04B 2/74 | 52/384 |
| 2005/0144855 | A1 * | 7/2005 | Waalkes | A47B 83/001 | 52/27 |
| 2006/0101724 | A1 * | 5/2006 | Hoekstra | E04B 2/7422 | 52/36.1 |
| 2011/0197519 | A1 * | 8/2011 | Henriott | E04B 2/7818 | 52/36.1 |
| 2015/0033642 | A1 * | 2/2015 | Johnson | E04F 19/08 | 52/173.1 |
| 2017/0022707 | A1 * | 1/2017 | Feldpausch | E04B 2/7457 | |
| 2017/0121973 | A1 | 5/2017 | Brandao et al. | | |

FOREIGN PATENT DOCUMENTS

| | | | |
|---|---|---|---|
| KR | 20190032043 | A * | 3/2019 |
| KR | 20190032043 | A | 3/2019 |

* cited by examiner

SYSTEM AND METHOD FOR BUILDING A MODULAR BASED PARTITION

CROSS-REFERENCE TO RELATED APPLICATIONS

This application is a non-provisional application which claims priority to U.S. Provisional Patent Application No. 63/057,342 filed on Jul. 28, 2020, which is incorporated by reference in its entirety.

FIELD OF THE DISCLOSURE

The present invention relates to a method and system for building one or more partitions or walls that may be used in a residential or commercial setting and that include a variety of designs and customizable features. Further, the partitions may be formed from modular pieces that may be connected to one another in a series of rows and columns to form the overall partition.

BACKGROUND

Many people work in environments where it would be beneficial to have one or more room dividers or other type of solid structure that can create a more defined workspace and provide additional privacy for the user. Cubicles and room dividers are commonly known but have their limitations in that they are often exceedingly difficult for individuals to assemble and are not particularly suitable for home use. More recently, individuals have tried to build their own walls or partitions in their home or business setting using Lego like bricks. However, these existing options are deficient and have their drawbacks. Namely, there is very little customization offered by these existing structures in that the user cannot add useful elements to the structures, such as cork boards, white boards, or other useful or decorative elements that a user would like to have built into or associated with the dividing structure or partition wall. Further, these existing structures do not offer good noise control and lack the ability to include soundproofing insulation that would provide the requisite noise control. Further, these existing structures do not provide the option to include integrated lighting in the structure or any other feature requiring a power source, such as a fan or charging port.

Accordingly, there is a still a need for an improved system and method for building useful walls or partitions that can be easily built by an individual in a home or business environment and that also include options for personal customization of the appearance and functions associated with the wall or partition.

SUMMARY

One or more embodiments are provided for a system for building a partition. The system may include a set of rows and columns of modules, each module comprising a front panel, a back panel, and outer connector beams that connect to a top, bottom, and side surfaces of each front panel and each back panel. In a non-limiting embodiment, the front panel and the back panel connect to each other, and the outer connector beams are configured to connect to a top, a bottom, or a side surface of the front panel and a top, a bottom, or a side surface of the back panel in order to connect to an adjacent module. A set of feet may connect or otherwise attach to a bottom row of the partition to stabilize the partition on a floor surface. The partition may include one or more add-on pieces, wherein the set of add-ons are configured to fit within an interior cavity or region of the front panel and the back panel of each module, as well as electrical connections to a power source to provide power to the set of add-ons that require electricity to function.

Additionally, the present description may include a system for building a partition, the system comprising one or more modules. In a non-limiting embodiment, the one or more modules may comprise frame sections, whereby the frame sections comprise elongated members having a first connectable end and a second connectable end. The one or more modules may further comprise corner connection pieces, whereby the corner connection pieces are configured to connect one frame section to another frame section at the first connectable end and the second connectable end of the and the frame sections. Further, the one or more modules may include electrical contact elements, whereby the electrical contact elements are configured to conduct electrical current, and one or more add-on pieces, whereby the one or more add-on pieces are customized to be attached to an interior opening/cavity of the frame sections when the frame sections are connected together, wherein the one or more modules are adapted to connect electrically to an electrical source and to conduct electricity to the one or more add-on pieces in order to provide an electrical function associated with the one or more add-on pieces.

Other aspects and advantages of the invention will be apparent from the following description and the appended claims.

BRIEF DESCRIPTION OF THE DRAWINGS

Embodiments of the present disclosure are described in detail below with reference to the following drawings. These and other features, aspects, and advantages of the present disclosure will become better understood with regard to the following description, appended claims, and accompanying drawings. The drawings described herein are for illustrative purposes only of selected embodiments and not all possible implementations and are not intended to limit the scope of the present disclosure.

DETAILED DESCRIPTION

Figure 1:
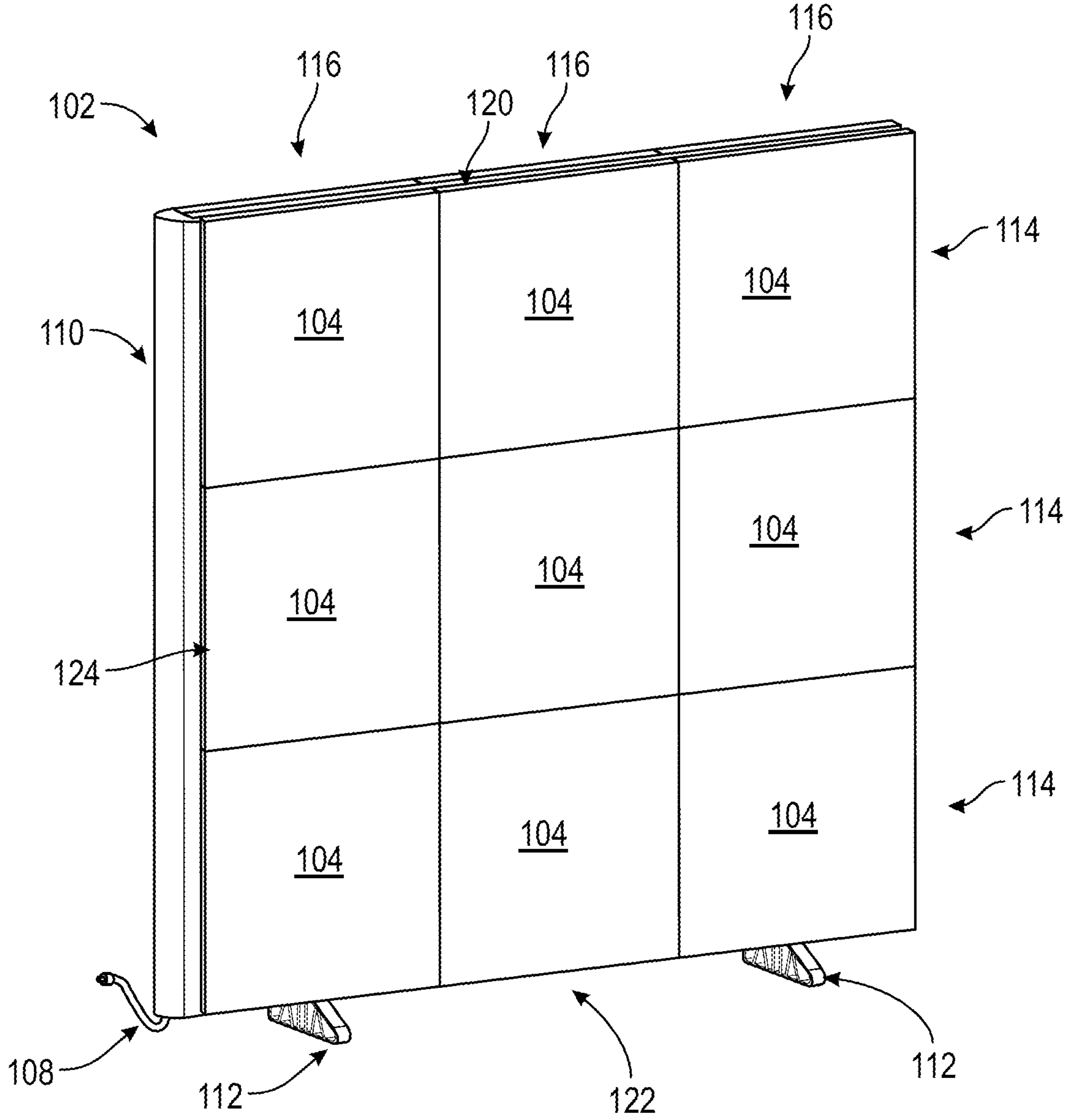
FIG. 1 is a pictorial illustration of a partition formed from a set of modules in accordance with an illustrative embodiment.

In the Summary above and in this Detailed Description, and the claims below, and in the accompanying drawings, reference is made to particular features (including method steps) of the invention. It is to be understood that the disclosure of the invention in this specification includes all possible combinations of such particular features. For example, where a particular feature is disclosed in the context of a particular aspect or embodiment of the invention, or a particular claim, that feature can also be used, to the extent possible, in combination with and/or in the context of other particular aspects and embodiments of the invention, and in the invention generally.

The term "comprises" and grammatical equivalents thereof are used herein to mean that other components, ingredients, and steps, among others, are optionally present. For example, an article "comprising" (or "which comprises") components A, B, and C can consist of (i.e., contain only) components A, B, and C, or can contain not only components A, B, and C but also contain one or more other components.

Where reference is made herein to a method comprising two or more defined steps, the defined steps can be carried out in any order or simultaneously (except where the context excludes that possibility), and the method can include one or more other steps which are carried out before any of the defined steps, between two of the defined steps, or after all the defined steps (except where the context excludes that possibility).

The term "at least" followed by a number is used herein to denote the start of a range beginning with that number (which may be a range having an upper limit or no upper limit, depending on the variable being defined). For example, "at least 1" means 1 or more than 1. The term "at most" followed by a number is used herein to denote the end of a range ending with that number (which may be a range having 1 or 0 as its lower limit, or a range having no lower limit, depending upon the variable being defined). For example, "at most 4" means 4 or less than 4, and "at most 40%" means 40% or less than 40%. When, in this specification, a range is given as "(a first number) to (a second number)" or "(a first number)-(a second number)," this means a range whose lower limit is the first number and whose upper limit is the second number. For example, 25 to 100 mm means a range whose lower limit is 25 mm and upper limit is 100 mm.

Certain terminology and derivations thereof may be used in the following description for convenience in reference only and will not be limiting. For example, words such as "upward," "downward," "left," and "right" would refer to directions in the drawings to which reference is made unless otherwise stated. Similarly, words such as "inward" and "outward" would refer to directions toward and away from, respectively, the geometric center of a device or area and designated parts thereof. References in the singular tense include the plural, and vice versa, unless otherwise noted. The term "set" as used herein may refer to "one or more" items.

The present disclosure is generally drawn to various embodiments for a system and method for building a partition that may help provide greater security, privacy, and a dedicated workspace or other type of desired space for the user. It is noted that the term "partition" as used herein may interchangeably be referred to as a "wall."

The partition, in one or more non-limiting embodiments, provided herein may be built from several "modular units" or "modules." The modules may have multiple frame sections that connect together and additional connectors that connect the modules together in order for an individual to build a partition having a number of rows and columns of the modules. Advantageously, the modules may include add-on pieces that are designed to fit within the interior cavity of the module. The add-on pieces may provide multiple functions that would be useful to a user. Such add-on pieces may include, but are not limited to, a fan, a lighting panel, a cover panel having a fabric cover, a clear or transparent or semi-transparent panel, a whiteboard, a cork board, or a charging port to name a few non-limiting examples. The partition may be adapted to include or to connect to an electrical power source in order to provide an electrical connection to the one or more modules and the one or more add-on pieces. Additionally, an add-on piece may include soundproofing insulation material, also known as sound batting, in order to reduce sound and provide noise control to the user. Additional details are provided below in relation to the Figures.

FIG. 1 is a pictorial illustration of a partition that is formed from several modules in accordance with a non-limiting embodiment. As shown in FIG. 1, partition 102 is configured to appear as a wall or a divider. Partition 102 may be used to divide an area for the user and to create a dedicated partitioned space for the user. A first partition 102 created of multiple modules (e.g., module 104) may be joined or located next to other partitions 102 and used to form the dedicated partitioned space, including a dedicated workspace, in some contexts, that are made of one or more adjoining or adjacent partitions 102.

Partition 102 is formed from multiple modules 104. Each module 104 may be connectable to the adjacent module 104 and to the module 104 located above or below the other. The combination of modules 104 forms one or more rows 114 and columns 116 that ultimately form the overall partition 102. In the non-limiting example shown in FIG. 1, there may be three rows 114 and three columns 116 of modules 104 that collectively form the partition 104. In one or more non-limiting embodiments, each module 104 may be two feet long by two feet wide (although one of ordinary skill in walls and partitions understands that this is a non-limiting example and other dimensions may be used).

In one or more non-limiting embodiments, the partition 102 may be configured to include a power source or to connect to an external power source. For example, the partition 102 may be configured to connect to an electrical outlet using power cord 108. Additionally, partition 102 may include a power cord cover piece 110 as shown in FIG. 1 to cover the sections of the power cord 108 that may run through exterior facing sides 124 of the one or more modules 104. It is noted that in alternative embodiments, rather than connecting to an electrical outlet, the partition 102 may be configured to be battery operated and to include a dedicated section for batteries to serve as a power source in the partition 102. In other embodiments, the batteries, if used as a complete or partial power source, may be non-rechargeable or may be rechargeable. The batteries, if used as a power source, may also be solar powered in some embodiments.

Figure 5:
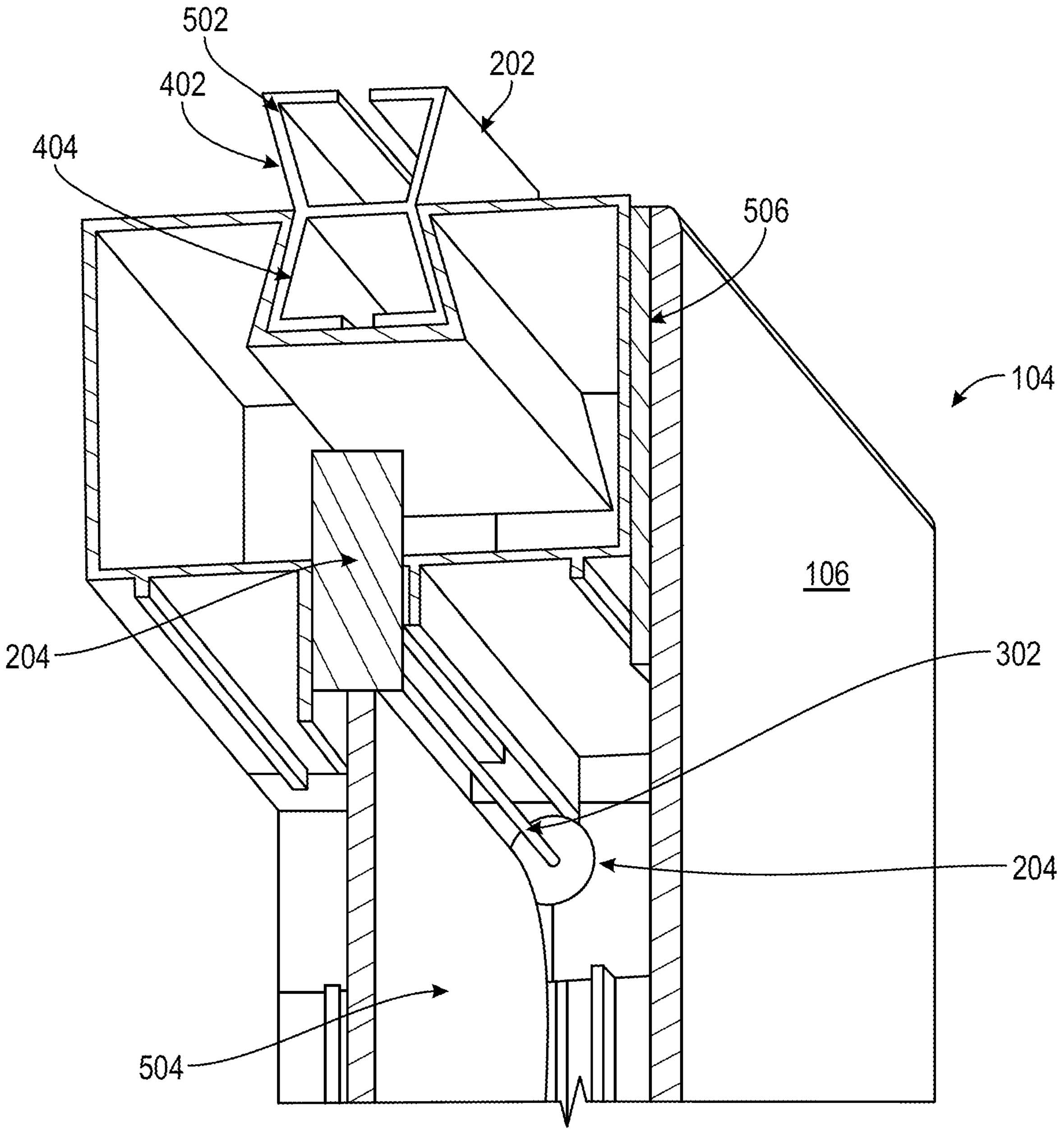
FIG. 5 is a partial view of the module shown in FIG. 2 with an add-on piece in accordance with an illustrative embodiment.

The electrical power source connectivity included with the partition 102 may be useful because the modules 104 are adapted to include various add-on pieces (e.g., add-on piece 504 as shown in FIG. 5). Some of the add-on pieces 504 may have functions that require electrical current and connectivity in order to function. Such add-on pieces may include a fan 1004 or a lighting panel 1010 without limitation thereto.

The partition 102 may include a top surface 120 and a bottom surface 122. The bottom surface 122 of the partition 102 may be stabilized using one or more feet 112. One or more feet 112 may be attached to the bottom surface 122 of the partition 102 and distributed along the bottom surface 122 at suitable locations to provide stability and support to the partition 102 (e.g., as formed by the set of connected modules 104).

Figure 2:
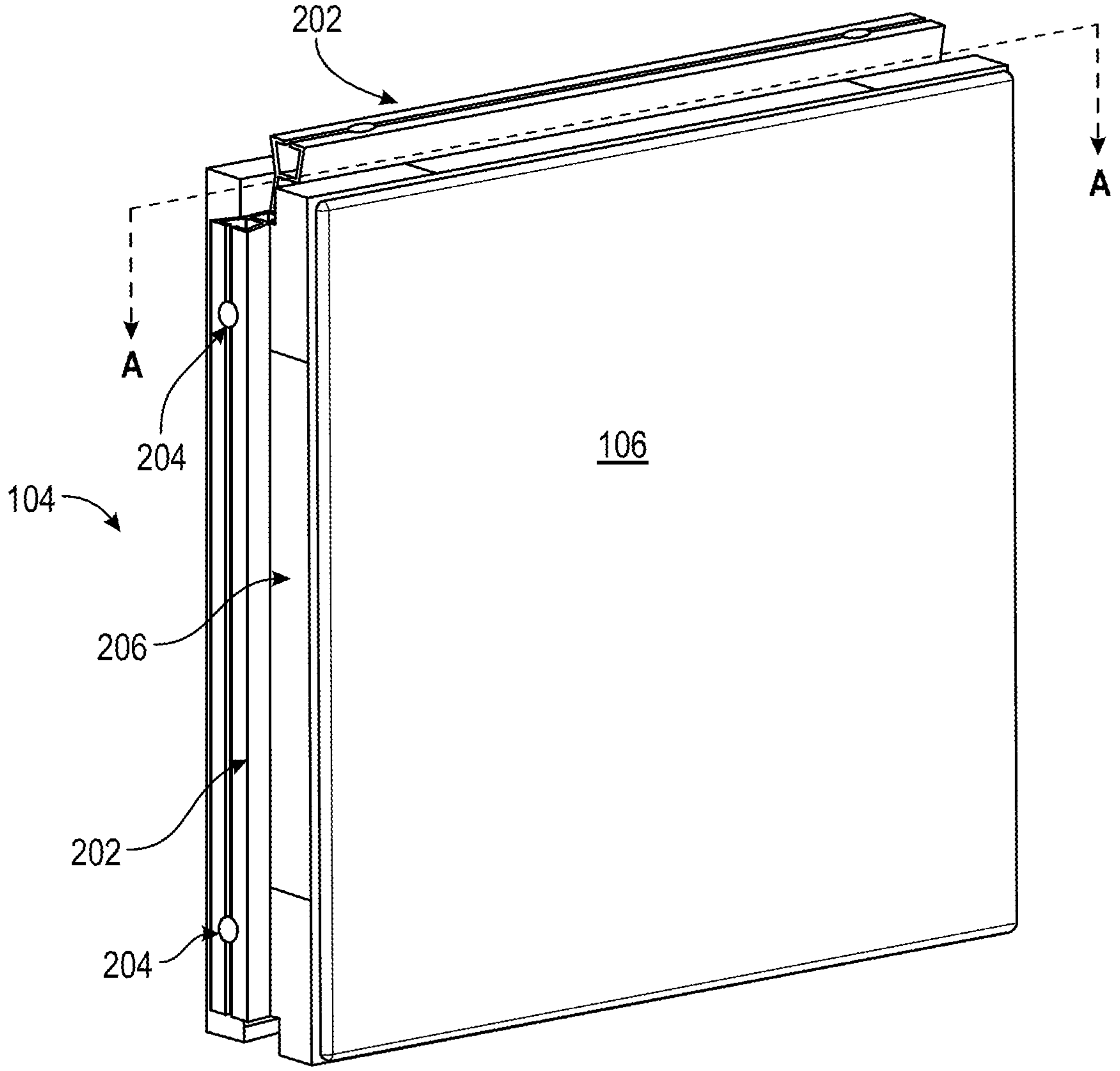
FIG. 2 is pictorial illustration of a module in accordance with an illustrative embodiment.

FIG. 2 provides a pictorial illustration of a completed or fully formed module 104 according to a non-limiting embodiment. As shown in FIG. 2, module 104 has a generally rectangular shape according to a non-limiting embodiment. In one non-limiting embodiment, module 104 is adapted to include a cover panel, such as cover panel 106. Cover panel 106, in one or more non-limiting embodiments, may be made from a fabric or fabric like material and serve as a fabric cover panel 106. Cover panel 106 may have many variations in material and design. In other embodiments, cover panel 106 may be made of plastic, glass, wood, or any other material as desired, or a combination thereof. Cover panel 106 may include colors and patterns and provide a unique, aesthetic design for each module 104 and the partition 102 when formed by the set of modules 104. In some embodiments, cover panel 106 may be opaque and may not be see through. In alternative embodiments, cover panel 106 may be clear or translucent. In such cases, the cover panel 106 may include a see-through plastic or glass or other combination of clear or transparent or semi-transparent materials. This may help to provide light to the user sitting behind the partition 102 and may be desirable for making the partition 102 more aesthetically appealing as well. The user can selectively choose any color, pattern, or type of cover panel 106 to include on a front or back side of each module 104. One of the benefits of the partition wall 102, as shown in the Figures and as described herein, is the ability to customize the appearance of the partition wall 102 to suit the taste and needs of the user. Accordingly, each cover panel 106 can reflect a variety of colors, patterns, styles, fabrics, and may be clear or translucent or opaque and not see through. In a non-limiting embodiment, the cover panels 106 may further include whiteboards, chalkboards, calendars, or other useful elements covering the interior and exterior of the formed module 104. Additionally, while the selected cover panels 106 selected for the modules 104 may help to provide a decorative, visually pleasing appearance to the partition wall 102, the cover panels 106 further have a functional ability to conceal some of the internal components (e.g., frame sections 206, electrical contacts 204, and corner pieces 304 as shown in FIG. 3) of the exemplary modules 104 shown and described in one or more non-limiting embodiments.

In one or more non-limiting embodiments, the module 104 may include a set of connector pieces, such as outer connector pieces 202. Outer connector pieces 202 (also referred to herein as connectors) are also shown more clearly in FIG. 3-5. The outer connector pieces 202 may allow the module 104 to connect to an adjacent module 104 and are configured to attach modules 104 to each other. Additionally, as shown in FIG. 2, in one or more non-limiting embodiments, modules 104 may include a plurality of electrical contacts, such as electrical contacts 204. A module 104 may also include one or more frame sections, such as frame sections 206 that are adapted to form the individual module 104.

Figure 3:
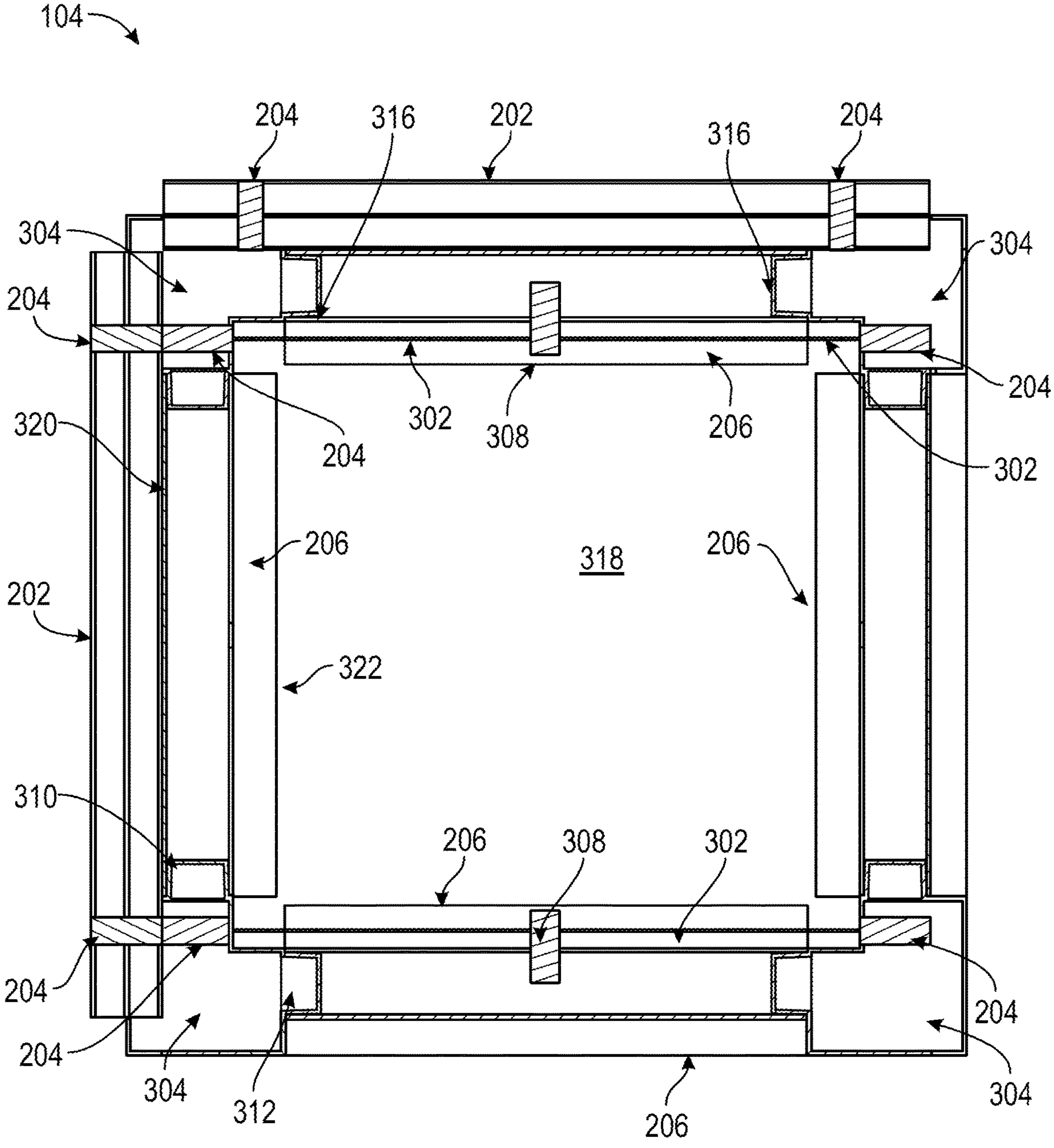
FIG. 3 is a pictorial illustration portraying a cross-sectional view of the module shown in FIG. 2 in accordance with an illustrative embodiment.
Figure 4:
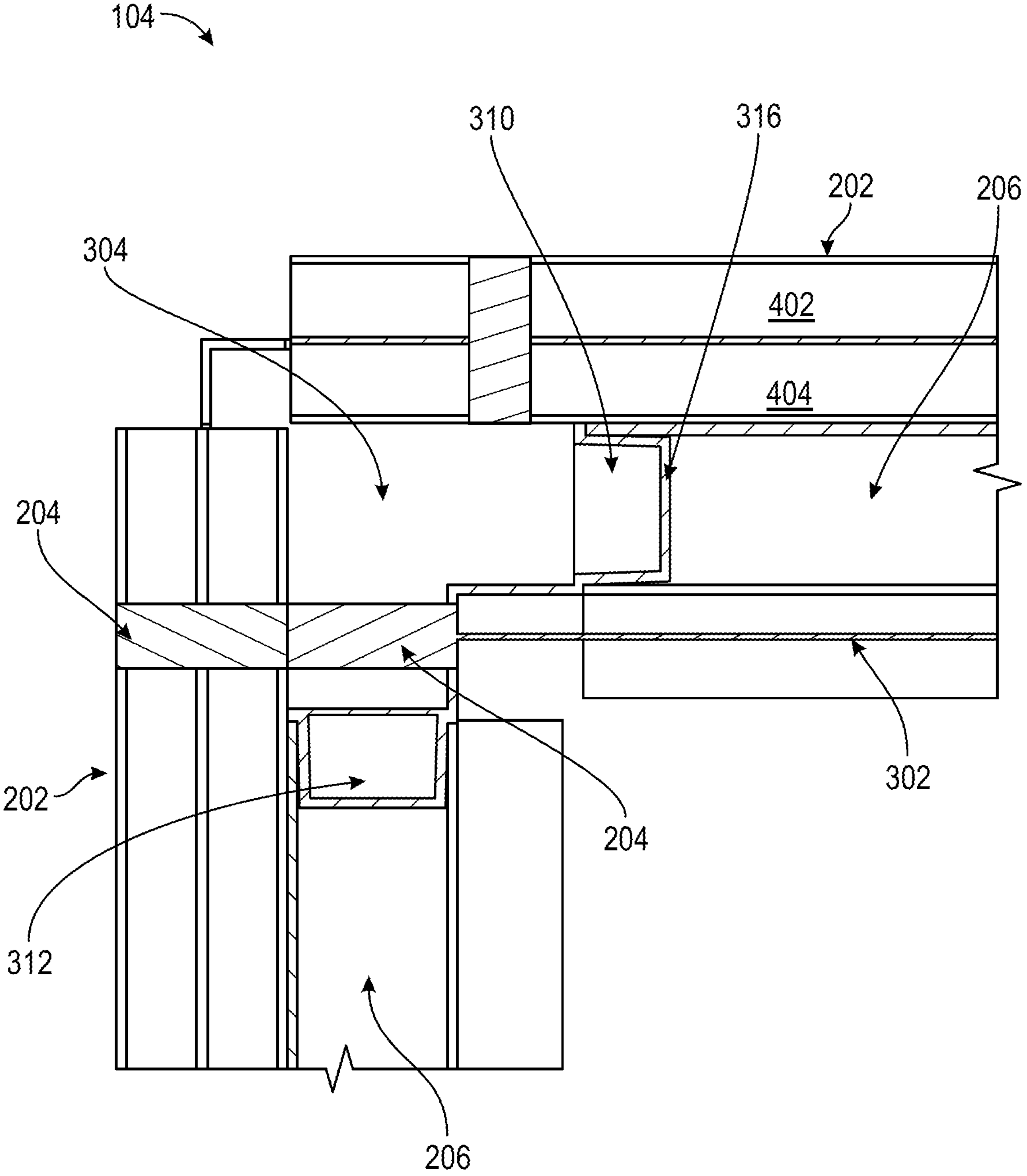
FIG. 4 is a pictorial illustration of a cross-sectional partial view of the module shown in FIG. 2 in accordance with an illustrative embodiment.

FIG. 3 shows a cross-sectional view of a module 104 taken along section line A-A as shown in FIG. 2. FIG. 4 also shows a partial cross-sectional view of an upper corner of the module 104 according to a non-limiting embodiment. In one or more non-limiting embodiments, a module 104 may be formed from multiple parts, including, but not limited to, electrical contacts 204, frame sections 206, corner connection pieces 304 (e.g., as shown in FIG. 3 and FIG. 4), and conductive wires 302.

In one or more non-limiting embodiment, frame sections 206 may be elongated members that include connectable ends, such as connectable ends 316 located on each opposite end 316 of each frame section 206 as shown in FIG. 3 and FIG. 4. The frame sections 206 may be arranged in a general rectangular arrangement to form a generally rectangular module 104. It is noted that other shapes may also be used to form module 104 in alternative embodiments.

In a non-limiting embodiment, each frame section 206 is connected to another frame section 206 using a corner assembly, such as corner connection piece 304 shown in FIG. 3 and FIG. 4. The corner connection pieces 304 may include a first end 310 and a second end 312 designed to connect two frame sections 206 arranged to be generally perpendicular to one another. Accordingly, in a non-limiting embodiment, each corner connection piece 304 is generally L-shaped so that the first end 310 and the second end 312 of the corner connection piece 304 are at approximately a right angle with respect to one another. The corner connection pieces 304 may be oriented in any desirable orientation to connect one elongated frame section 206 with the other elongated frame section 206 and so as to form an overall rectangle shape that the module 104 is based on (e.g., as shown in FIGS. 1-3). In one or more non-limiting embodiments, each corner connection piece 304 may be molded and may be made of at least two pieces to simplify the manufacturing process. Alternatively, the corner connection piece 304 may be formed as a single piece.

With respect to the frame sections 206, the frame sections 206 may be manufactured using an extrusion manufacturing process. As known in the art, extrusion is a process used to create objects having a fixed cross-sectional profile. Accordingly, a material is pushed through a die of the desired cross-section and the desired object formed. In this manner, the frame sections 206 may be formed to have the same general cross-sectional profile. In a non-limiting embodiment, the frame sections 206 may have the same general cross-sectional profile as shown in FIG. 3-FIG. 5. The frame sections 206 may also be referred to herein as "extruded frame sections." In other embodiments, frame sections 206 may be formed using alternative manufacturing processes other than extrusion, including, but not limited to, molding, and may have a different appearance than that shown in the above Figures.

In addition to the above, the outer connector pieces 202 may be configured to connect to the outer edges 320 of the frame sections 206 as shown in FIG. 3. The connectors 202 are used to connect each module 104 to an adjacent module 104 (including the modules 104 located above or below) in order to form a row 114 and/or column 116 of the overall partition 102. The outer connector pieces 202 are adapted to connect to both the corner connection pieces 304 and to the extruded frame sections 206 in one or more non-limiting embodiments. To connect the outer connector pieces 202 to the corner connection pieces 304 and to the extruded frame sections 206, the outer connector pieces 202 may be attached using adhesives or fasteners or a combination thereof. Alternatively, the outer connector pieces 202 may be designed to snap or slide into designated openings of the corner connection pieces 304 and the extruded frame sections 206.

As shown in FIG. 3, the modules 104 may include electrical wires 302 that run horizontally along a top and bottom of the module 104 (e.g., as formed by the multiple interior frame sections 206 and the corner connection pieces 304). The electrical wires 302 may be made from or incorporate a conductive material so that the electrical wires 302 may transmit the electric current to an add-on piece (e.g., add-on piece 504 as shown in FIG. 5). In a non-limiting embodiment, the wire 302 may be made from or may incorporate any type of metal, which is a conductive type of material that can conduct electric current. As shown in FIG. 3, there is a first electrical wire 302 located beneath a top frame section 206 and a second electrical wire 302 located above a bottom extruded frame section 206. In a non-limiting embodiment, the first and second electrical wires 302 are parallel to one another and extend horizontally in the example shown in FIG. 3 between connecting electrical contacts 204. In alternative embodiments, there may be more or less electrical wires 302 positioned in the module 104 between any number of electrical contacts 204. In some embodiments, some of the included electrical wires 302 may be perpendicularly arranged with respect to the other while some of the included electrical wires 302 may be parallel to each other. In some embodiments, the electrical wires 302 may extend in a horizontal and/or vertical orientation.

As shown in FIG. 3, a number of electrical contacts 204 may be positioned and distributed throughout the module 104, including on the top, bottom, and sides of the formed module 104. The formed module 104 may be formed of any number of interior connector pieces 206 and may have the outer connection pieces 202 surrounding or connected to the interior connector pieces 206. The electrical contacts 204 may be inserted into designated openings or gaps in the outer connector pieces 202 and the interior connector pieces 206, as shown in FIG. 3, which are positioned to connect with the electrical and conductive wires 306.

The electrical contacts 204 may be made of or incorporate a conductive material, such as, without limitation thereto, metal. In a non-limiting embodiment, the electrical contacts 204 may have a rectangular shape and may be a separate small block shaped piece configured to fit within designated apertures in the outer connector pieces 202, the interior frame sections 206, and the corner connection pieces 304. The assembler or manufacturer of the module 104 can add the electrical contacts 204 to each designated aperture or opening in order to provide an electrical connection between one module 104 to another adjacent module 104.

As shown in FIG. 3 and also FIG. 5, there are electrical contacts 204 aligned with each electrical wire 302 that extend either in parallel or perpendicular arrangement. In FIG. 3 and FIG. 5, the electrical wires 302 extend in parallel across a top and bottom area of the module 104 so as to provide an electrical connection to any components included within or connected to the module 104 that require an electrical connection. Such components may include a fan or a lighting piece that has LED lights or other types of lights, such as for example, the lighting panel add on piece 504 shown in FIG. 5. In a non-limiting embodiment, these electrical contacts 204 may extend horizontally through designated apertures or openings in either corner connection piece 304.

Further, two centrally located electrical contacts 308 are also included in the module 104 shown in FIG. 3. The central electrical contacts 308 directly connect to a center portion of the electrical wires 302, whereby each central electrical contact 308 is located above the top electrical wire 302 and below the bottom electrical wire 302 in a non-limiting embodiment. A central electrical contact 308 may be positioned also between an electrical wire 302 that extends in a vertical (as opposed to horizontal or transverse orientation) in other embodiments.

Accordingly, a system is provided for in each module 104 that incorporates a plurality of electrical wires 302 and electrical contacts 204,308 that allows for electricity to be provided to any module 104, which then may be used for any add-on electrical pieces 504 (e.g., as shown in FIG. 5) that require electricity to function (e.g., a light panel, a fan, a charging port, etc.).

As shown in FIG. 4 and FIG. 5, each outer connector piece 202 may include a top piece 402 and a bottom piece 404 that may be fused or otherwise joined together. The outer connector pieces 202 may have a unique profile 502 as shown in FIG. 5, in which the cross-sectional profile of the outer connector piece 202 is an angled H-shaped profile. The outer connector pieces 202 are configured to slide or snap into an outer edge 320 of an interior frame section 206. The outer connector pieces 202 may be arranged to fit within the outer edge 320 of an interior frame section 206, but in some cases, the user may not want to provide an outer connector piece 202 for each interior frame section 206. For example, as shown in FIG. 1, an exterior facing side 124 of the modules 104 located in the first column 116 are connected to a power cord cover 110. These modules 104 do not require outer connector pieces 202 to be connected to the exterior facing side 124 of the modules 104 in the first column 116 of the partition 104, in one or more non-limiting embodiments, because the power cord cover 110 is connected to this exterior facing side 124 of the modules 104 instead.

With respect to FIG. 5, FIG. 5 shows an add-on piece 504, which in this example is a light panel. Accordingly, it is intended that the user may be able to include a light panel as an add-on piece 504 that produces light using the electrical connection provided by the electrical wires 302 and electrical contacts 204,308 that conduct electric current from a connected power source (e.g., a power outlet, batteries, including, but not limited to solar powered batteries, or any other power source).

As shown in FIG. 5, the light panel (e.g., add-on piece 504) may connect to each electrical contact 204 located on either side, whereby the electrical contacts 204 also connect to the conductive electrical wires 302 (e.g., as shown in FIG. 5) located above and below the light panel add-on piece 504. Further, the light panel as an add-on piece 504 may connect or contact the central electrical contacts 308 which are shown in FIG. 3. This is one way that an electrical connection may be provided to the add-on pieces 504. One of ordinary skill in the art understands that alternative electrical systems may be provided for the modules 104 that are in keeping with the spirit and the scope of the invention as described herein. The light panel as an add-on piece 504 may include a number of light emitting diodes (LEDs) in one or more non-limiting embodiments, or any other light producing elements.

As noted above, other add-on pieces 504 may include, but are not limited to, a fan that provides cooling air to the user. Other add-on pieces 504 may include a white board or cork board that may be inserted within an interior opening/cavity 318 (e.g., as shown in FIG. 3) of the module 104. Additional add-on pieces 504 may include any type of transparent, semi-transparent, translucent panel. Other add-on pieces 504 may include decorative tiles, mirrors, or other decorative elements designed to fit within the interior opening/cavity 318 of the module 104.

It is intended that the modules 104 described herein may also provide noise control such that the user may add soundproofing insulation material (also referred to as sound batting). The sound proofing insulation material may reduce or eliminate loud noises outside of the partition 102 (e.g., partition 102 shown in FIG. 1). The sound proofing insulation material may be provided to the user as add-on pieces 504 that are pre-cut and sized to fit within an interior opening/cavity 318 of the module 104. Additionally, or alternatively, the sound proofing insulation material may be designed to adhere or otherwise attach to a front and/or back surface of the module 104, and the user may keep that material showing on the front and/or back surface of the module 104 or may also choose to attach a cover panel 106 to the sound proofing insulation material. Such sound proofing insulation material may be particularly useful to reduce loud noise and may also be useful for those who want to create a soundproof recording studio using the modules 104 and formed partitions 102.

Any of the add-on pieces 504 may be configured to attach to the interior surface 322 (e.g., as shown in FIG. 3) of the frame sections 206. The add-on pieces 504 may be adapted to snap in or slide in or may otherwise attach using fasteners, adhesives, or a combination thereof. The add-on pieces 504 are designed to give the user flexibility and choice in the end appearance of the partition 102 and the functions and features offered by each module 104 of that partition 102.

As shown in FIG. 5, in one non-limiting embodiment, there may also be a back panel 506 that covers the assembled corner pieces 304 that are connected to each interior frame section 206, and then a cover panel 106 may connect or attach to that back panel 506. It is noted that the back panel 506 may be omitted in alternative embodiments, whereby the cover panel 106 may attach directly to the corner pieces 304 and the interior frame sections 206. As noted above, in some cases, the cover panel 106 may be a fabric type cover panel 106, but in other cases, the cover panel 106 may be made of other materials (e.g., glass, wood, plastic, and/or reflective type materials). The cover panel 106 may be clear and transparent or may be opaque and not transparent. If the user intends for the add-on piece 504 to be visible, such as with a lighting panel or other add on piece 504 and accessible from the exterior of the module 104 or from the exterior facing sides of the partition 102, the user may choose not to position a cover panel 106 over the add-on piece 504. Further, the user may choose to install a cover piece 106 that is transparent over one or both sides of the module 104 in order to provide some coverage and protective barrier to the add on piece 504, yet the add-on piece 504 is still visible through the transparent cover panel 106.

Figure 6:
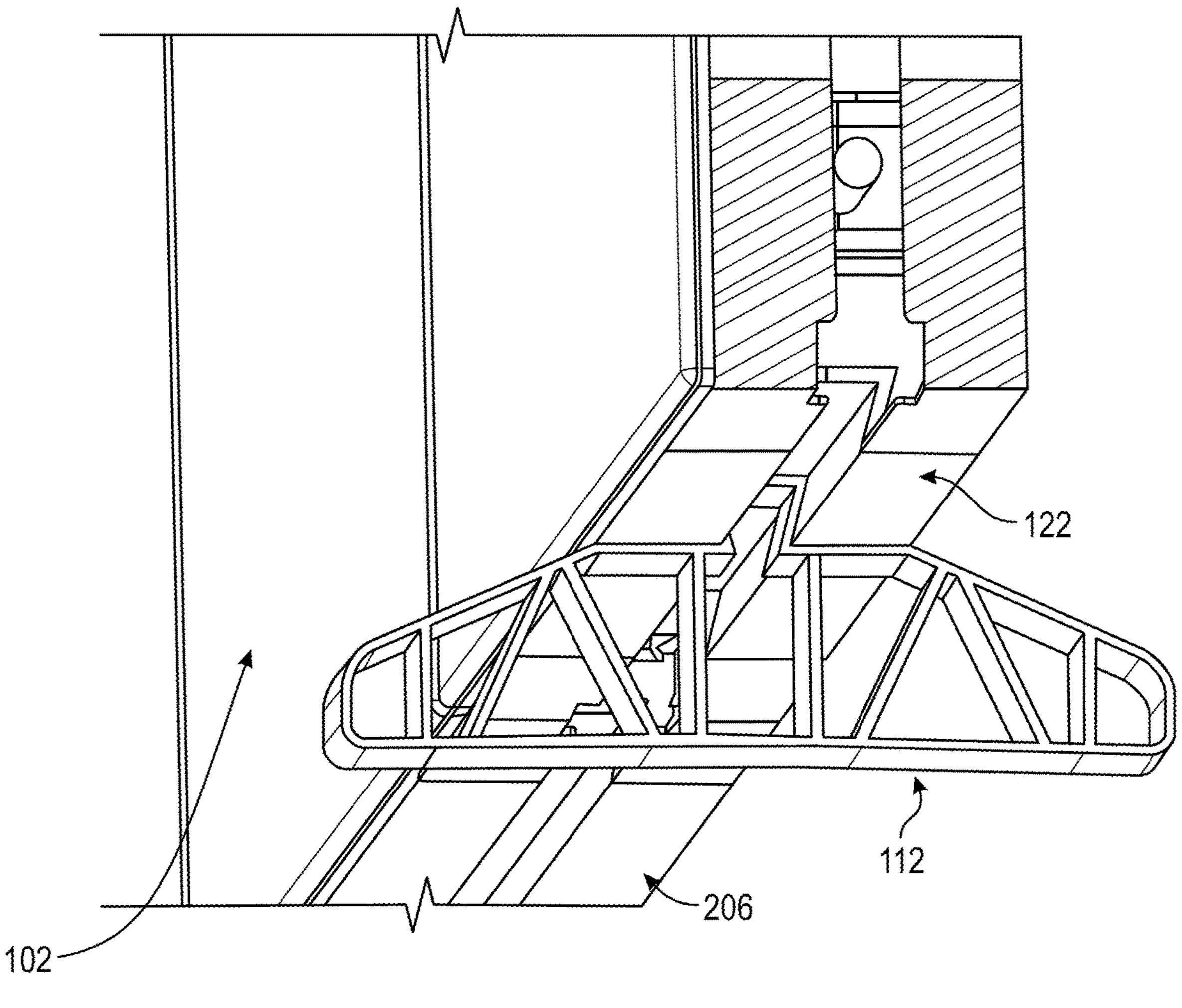
FIG. 6 is a pictorial illustration of a bottom surface of a partition and a foot piece in accordance with an illustrative embodiment.

FIG. 6 shows a pictorial illustration and close-up view of an example foot 112 connected to the formed partition 102. The foot 112 shown in FIG. 1 and FIG. 6 may be used to provide support and stability to a partition 102. Any number of feet 112 may be distributed along a bottom surface 122 of the partition 102, either when fully formed or during the assembly process. Accordingly, in a non-limiting embodiment, the feet 112 may be able to snap or slide in place or otherwise connect to an interior frame section 206 and/or to outer connector pieces 202 located on one or more modules 104 that make up a bottom row 114 of the partition 102. Alternatively, one or more brackets or other tool may be used to attach the feet 112 to another section of the bottom surface 122 of the partition 104. The feet 112 may be fixed in place or may be configured to angle in different directions in one or more non-limiting embodiments.

It is intended that any individual be able to build a partition 104 of a desired height and width having the appropriate number of modules 104. Further, it is intended that any individual be able to include the desired number and type of add-on pieces 504 in any chosen module 104. Accordingly, to simplify the building process, a user may be provided with a module 104 that is partially formed. For example, when purchased or otherwise provided to a user, the module 104 may have the general appearance of the module 104 as shown in FIG. 3. Accordingly, at least four extruded sections 206 may be assembled together and connected via the corner connection pieces 304. Further, the conductive electrical wires 302 may also be included and connected to the side electrical contacts 204 and central electrical contacts 308 shown in FIG. 3. Additionally, in some embodiments, at least one or two outer connector pieces 202 may already be provided or attached to the corner connection pieces 304 and the interior facing frame sections 206. Then, the user may attach any add-on pieces 504 by fitting them or otherwise attaching them within the interior opening/cavity 318 of the module 104. Further, the user may attach a cover panel 106 or any additional outer connector pieces 202 as needed to complete the partition 102.

Once the desired number of modules 104 is assembled in the desired number of rows 114 and columns 116, the user may run the provided power cord 108 along one side of the modules 104 and then attach the power cord cover 110 over that side (e.g., 124 as shown in FIG. 1) of the assembled modules 104 in a non-limiting embodiment. Alternatively, or additionally, if a dedicated battery section is included with the partition 102, the user may include the batteries in this location so as to power any of the add-on pieces 504 that require a power source to function.

In this manner, a user may be enabled to create a partition 102 that is customizable and has multiple design options that the user can vary regularly. Accordingly, the user can assemble and disassemble the partition 102 with relative ease and change the included cover panels 106 and add-on pieces 504 as desired. Further, the user may add shelving or other items to the partition 102 in one or more non-limiting embodiments.

Figure 7:
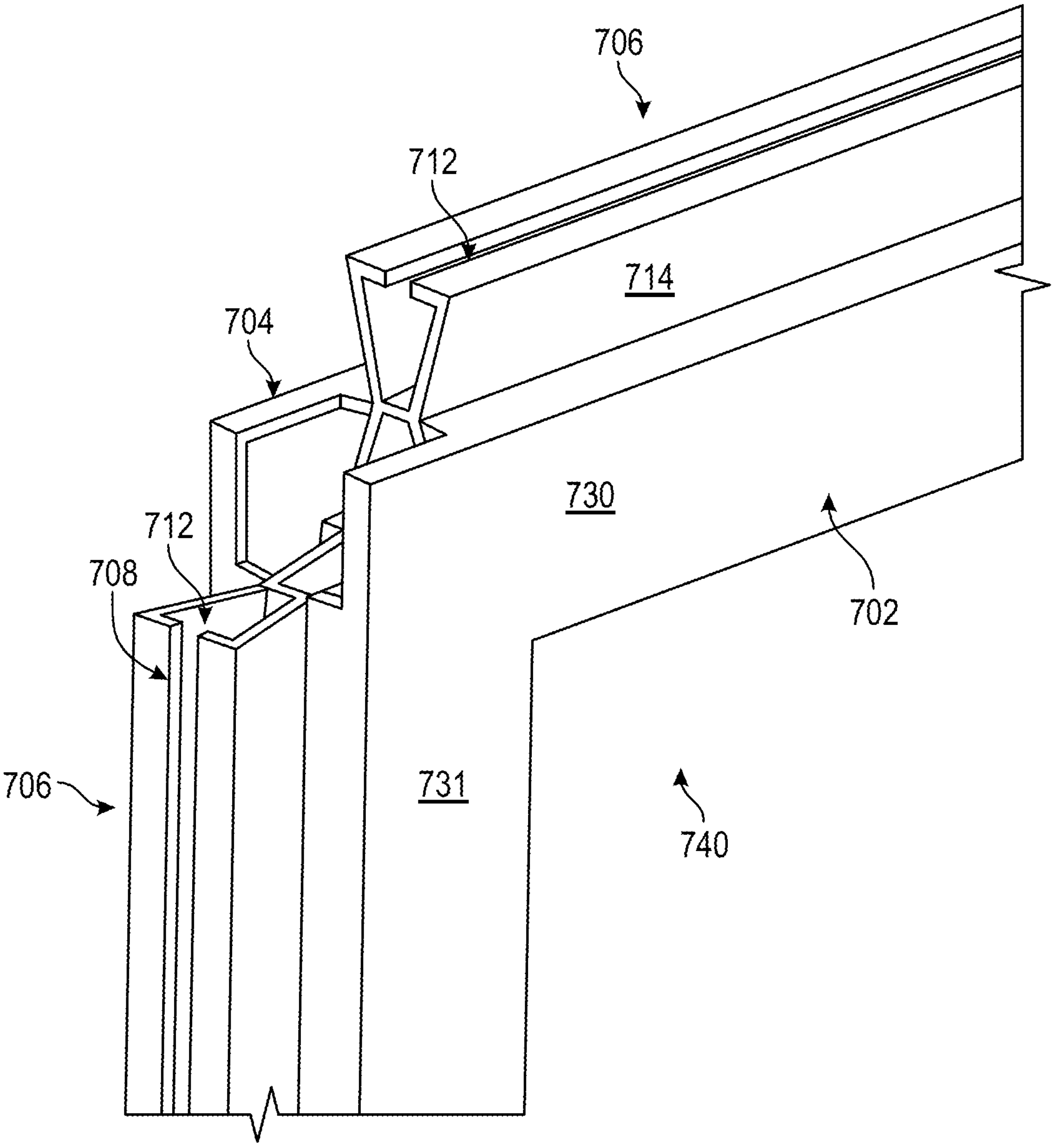
FIG. 7 is a pictorial illustration of another embodiment for a module having a set of opposing front and back molded sides and extruded connectors that connect to each molded front and back molded side.
Figure 8:
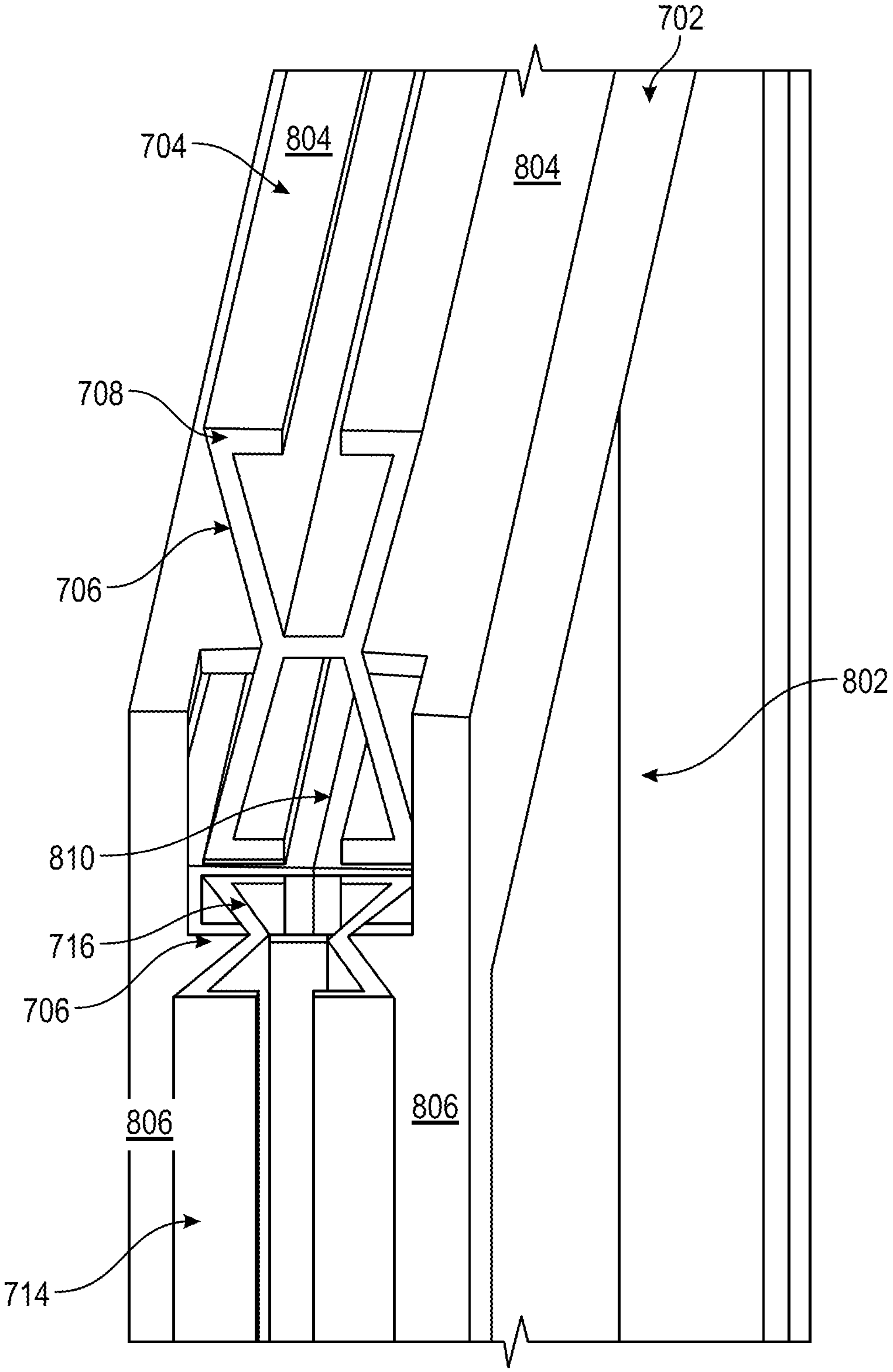
FIG. 8 is a pictorial illustration of a close-up view of the longitudinal and transverse connectors shown in FIG. 7 connecting to the opposing front and back frame sides that form a module for a partition wall.
Figure 9:
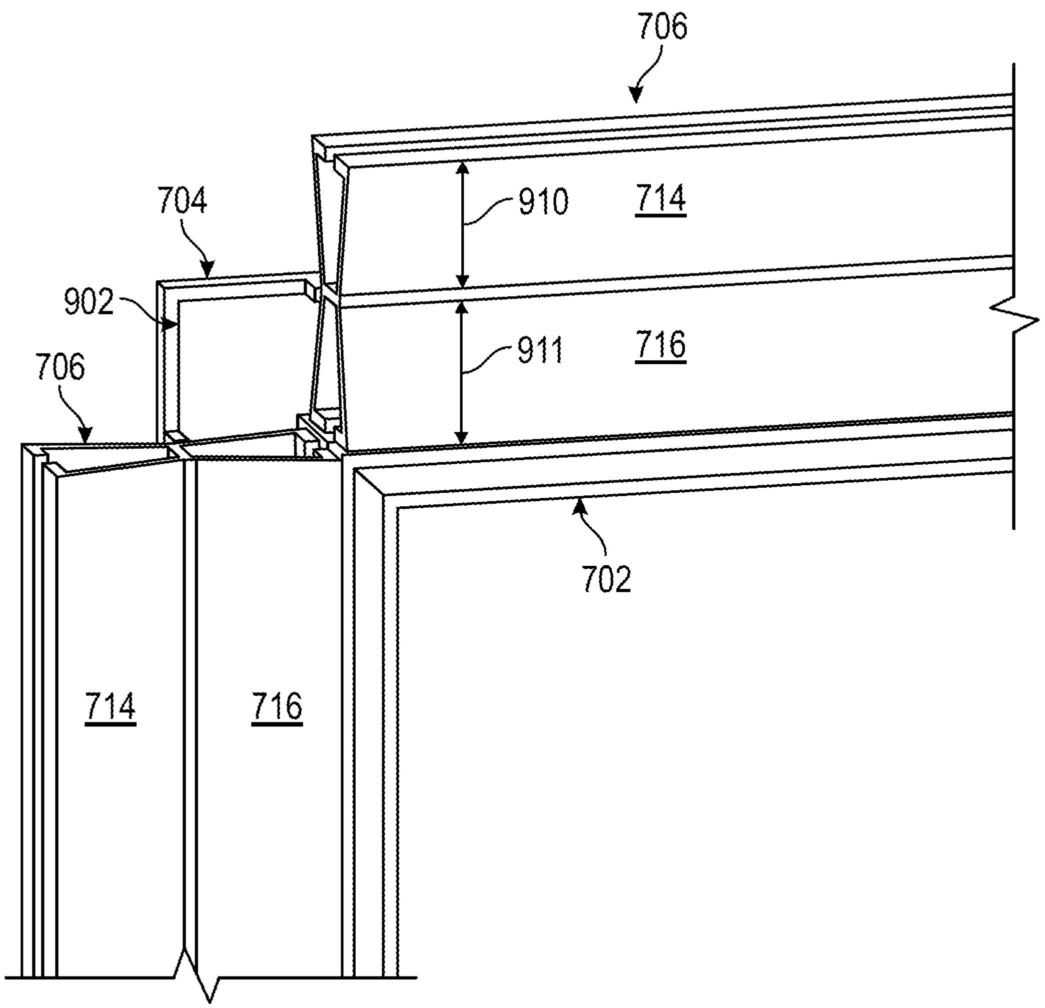
FIG. 9 is a pictorial illustration of a back frame side as shown in FIG. 7 with a close-up view of the interior of the back frame side and the longitudinal and transverse connectors that connect to the back frame side.

FIGS. 7-9 show another exemplary, non-limiting embodiment for how modules 104 may be put together by either a user or manufacturer or other party to form a partition 102, as shown in FIG. 1. FIG. 7 is a partial view showing a front panel 702 and back panel 704 joined together with a top outer connector 706 and a side outer connector 706 according to non-limiting embodiments. FIG. 8 is a partial view showing a side view of the front panel 702, back panel 704, and top outer connector 706 and a side outer connector 706 joined together at joint 810. FIG. 9 shows another partial view of the back panel 704 joined together with part of the front panel 702 shown in FIG. 9 as well.

As shown in FIG. 7, front panel 702 and back panel 704 may each be joined together and used to create a module 104 for a partition 102. Both the front panel 702 and the back panel 704 may be symmetrical and have the same construction or frame assembly in one or more non-limiting embodiments. In a non-limiting embodiment, the front panel 702 and back panel 704 may both include a top piece 730 and left side piece 731, as shown in FIG. 7. The top piece 730 may be a mirror image of the bottom piece (not shown) of the front panel 702 and the back panel 704. Similarly, the left side piece 731 shown in FIG. 7 may be a mirror image of the right side piece (not shown) for the front panel 702 and the back panel 704 used to form a module 104. The front panel 702 and the back panel 704 may have the shape and appearance of a picture frame with a top piece and bottom piece that are horizontally oriented and connected to the two left and right side vertically oriented pieces. In a non-limiting embodiment, there may be an interior cavity or opening 740 into which other add-on pieces, such as add on piece 504 shown in FIG. 5 and described above, may be inserted.

Each outer connector 706 may have the same cross-sectional profile 708. In a non-limiting embodiment, as shown in FIGS. 7-9, the outer connectors 706 may be formed having a top piece 714 joined with a bottom piece 716. In a non-limiting embodiment, the top piece 714 of the outer connector 706 may be joined with or formed with a symmetrical bottom piece 716. The top piece 714 and the bottom piece 716 may have gaps 712 or cavities formed inside each piece 714, 716. In a non-limiting embodiment, the top piece 714 and/or bottom piece 716 of the outer connectors 706 can slidingly engage or otherwise fasten onto a designated connection rail or other portion of the front panel 702 or the back panel 704 to form a module 104 that can connect with other adjacent modules 104. FIG. 9 shows a closer view of each connector 706. In a non-limiting embodiment, the top piece 714 of the outer connector 706 angles 910 in an upward and outward direction and the bottom piece 716 of the outer connector 706 angles 911 in a downward and outward direction. The gaps or cavities 712 within the outer connectors 706 (e.g., within each top piece 714 and bottom piece 716) may be adapted for receiving one or more electrical contacts 204 (e.g., as shown in FIG. 3-5) which may be inserted in designated openings formed in the outer connectors 706 and may provide an electrical connection between each formed module 104 in order to provide electricity to the functional add-on pieces added to the modules 104, such as, but not limited to, a fan, lighting panel, or any other piece that needs electricity to function. Further, any power cords (e.g., 108 shown in FIG. 1) that connect to an electrical outlet can be ran through one or more outer connector pieces 706 to provide an electrical connection. Further, the electrical contacts 204 may be aligned with one or more electrical wires (e.g., electrical or conductive wires 302 shown in FIG. 3) in order to provide an electrical connection. The power source as noted above can be from one or more batteries, an electrical outlet that a power cord 108 may be plugged into, or any other type of power source.

FIG. 9 shows that back panel 704, which is symmetrical to the front panel 702, may have a protruding top and side surface 902 that protrudes past the joint 810 area of the front panel 702 and the back panel 704. The outer connectors 706, whether attached to a top surface 804 or a side surface 806 (e.g., as shown in FIG. 8) of the front panel 702 or the back panel 704 may protrude above and over these surfaces of the front panel 702 and the back panel 704 in a non-limiting embodiment.

In a non-limiting embodiment, the front panel 702 and back panel 704 can be snapped, slidingly engaged, or otherwise fastened or attached together to form a module 104 as shown in FIG. 8. Any necessary outer connectors 706 can be added to a top gap, bottom gap, or side gap formed between the connected front panel 702 and back panel 704. The front panel 702 and back panel 704 may be joined at a joint 810 as shown in FIG. 8 when attached together. In a non-limiting embodiment, the interior cavity 740 of the front panel 702 and back panel 704 may have a back board 802, as shown in FIG. 8, inserted within the interior cavity 740. Any other add-on piece 504, as shown in FIG. 5 and as described above, may then be added to one or more front or back sides of the formed module 104. Further, one or more pieces of sound batting and one or more cover panels 106 may be added to the front or back sides of the formed module 104.

As noted above, the partition 102 may be designed by the user and may also be built by the user. In other embodiments, the user may select which features the user wants to purchase from a manufacturer and/or assembler, and then order the assembled modules 104 which are customized so that each formed module 104 includes the desired add-on pieces 504 and/or cover panels 106 or other elements, and the user is provided with the requested number of modules 104 to form a partition 102 having a certain number of rows 114 and columns 116 (and also having a desired width and length). In a non-limiting embodiment, the user may be able to select the colors, shapes, patterns, size, sound batting, add-on pieces 504, cover panels 106, number of feet 112, and any other aspect of the partition 102 that the user desires for his or her partition 102 to include. In a non-limiting embodiment, the user may be able to select these items from a website, application, catalog, in a store, or via any other means to purchase and order a particular set of components to form modules 104 or to purchase and order the formed modules 104 themselves.

Figure 10:
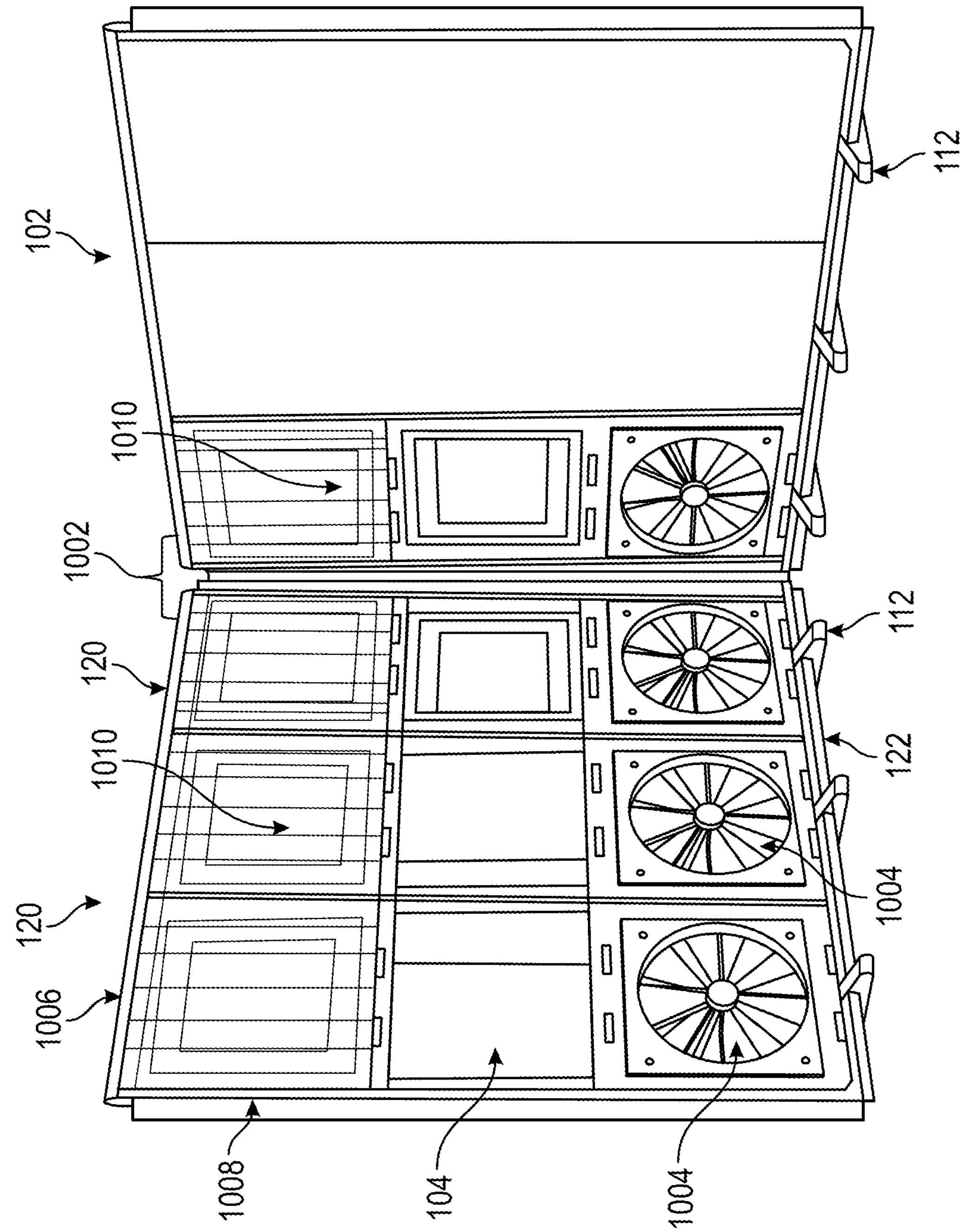
FIG. 10 is a pictorial illustration of an exemplary partition wall having one or more fans included on a row of the partition wall and various modules with opaque and translucent cover panels.

The user may also purchase as many modules 104 as desired to form as many partitions 102 as desired. The assembled partitions 102 may be arranged in any general arrangement to form a workspace or other organized set of partitions or dividers. FIG. 10 shows an example of two partition walls 102 that have been joined together at joint 1002. In the example shown in FIG. 10, the two partition walls 102 are joined at a right angle, but in other embodiments, the partition walls 102 can be arranged having other angled connections, including, acute or obtuse angles. In yet other embodiments, the partition walls 102 can be stand-alone walls separated from each other. Each partition wall 102 may alternatively be connected to other walls or other surfaces, including, but not limited to, tables, counters, cabinets, or other surfaces.

FIG. 10 shows that partition wall 102 may include one or more formed modules 104 that have cover panels 106 of varying levels of opacity. Some of the cover panels 106 may be clear and transparent so that the user can see through the module 104 and more light may be allowed to shine through the module 104. Other cover panels 106 may be opaque and may not be see through. Further, FIG. 10 shows how the partition 102 may be formed having rows 114 and columns 116 of a desired number of modules 104. In a bottom row 114, in a non-limiting embodiment, one or more fans 1004 and lighting panels 1010 are included as add-on pieces 504 configured to fit and/or attach within an interior cavity (e.g., interior cavity 318 shown in FIG. 3 or interior cavity 740 shown in FIG. 7) of the formed module 104. The electrical capabilities of the partition 102 are provided as noted above, in one or more non-limiting embodiments, by electrical contacts 204 and conductive wires 302 distributed throughout the formed modules 104 that provide an electrical connection to the electrical add-on pieces 504, such as fans 1004 and any lighting panels 1010.

The partition 102 may include one or more feet 112 attached to a bottom surface 122 for stabilizing the partition wall or divider 102. The top surface 120 may be covered by one or more top cap pieces 1006, and the side surface may also be covered by one or more side cap pieces 1008 (which may be the same as power cord cover piece 110 shown in FIG. 1) to cover any outer connector pieces of the formed modules 104 located on either a top surface or side surface of the formed partition.

Figure 11:
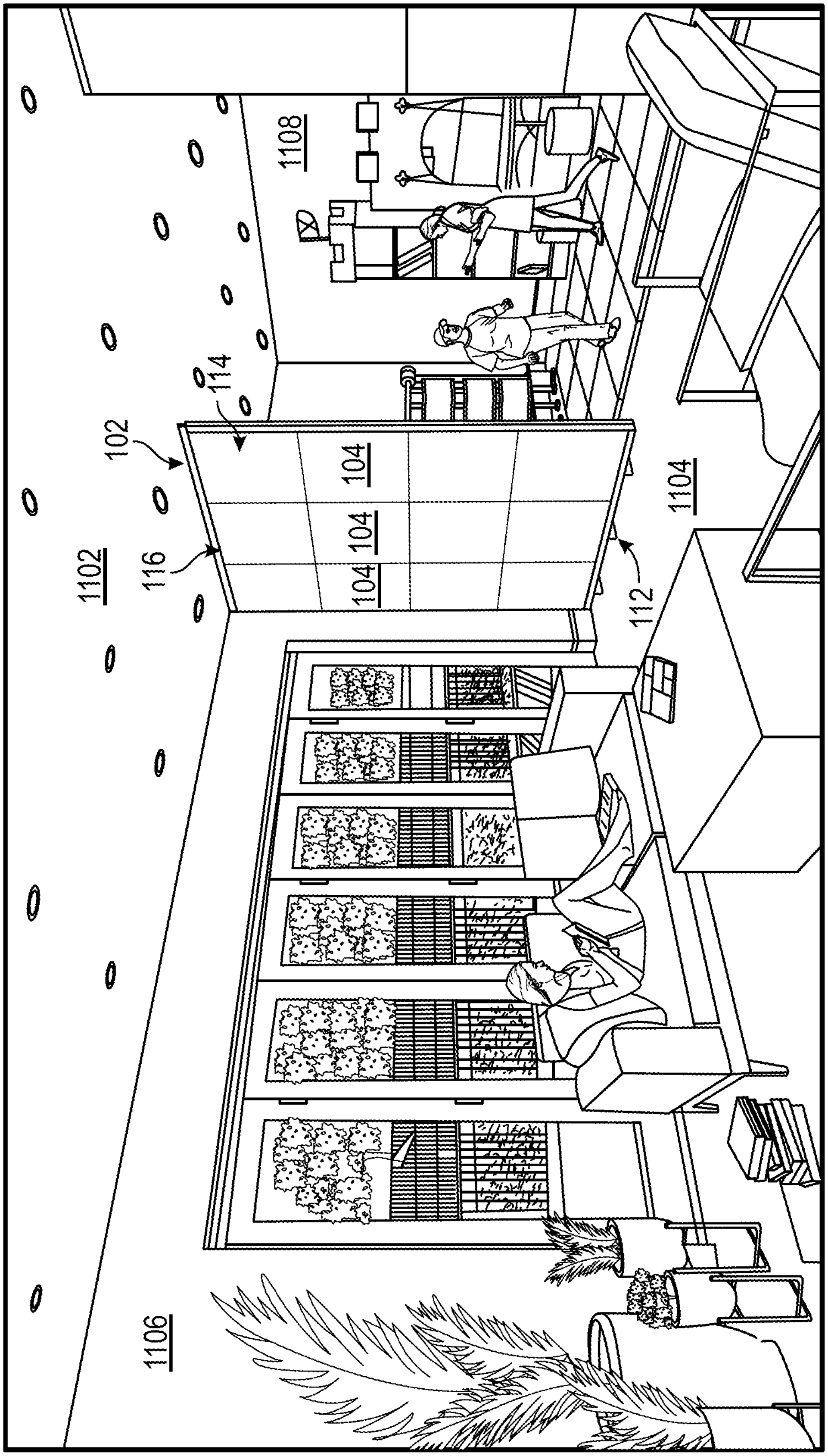
FIG. 11 is a pictorial illustration of a partition wall included in a home setting.

FIG. 11 shows an exemplary illustration of partition 102 located in a home setting. In a non-limiting embodiment, the partition 102 may extend from a top ceiling 1102 to a floor or ground surface 1104. Accordingly, the partition 102 may be as short or tall as the user desires and for the particular space in which the partition 102 is to be located. The partition 102 may still be formed of the designated number of modules 104 organized into rows 114 and columns 116 and having the features that the user selects and customizes for each partition 102. In the exemplary embodiment shown in FIG. 11, the partition 102 is used to divide a living room 1106 from a playroom 1108 and provides additional privacy as well as organizes the space in the house better. Accordingly, partitions 102 formed from the one or more formed modules 104 may be particularly useful and beneficial in a residential setting. Accordingly, in some embodiments, the partitions 102 may be formed not to provide solely a workspace to the user but to form a bedroom, play area, or other type of space.

Figure 12:
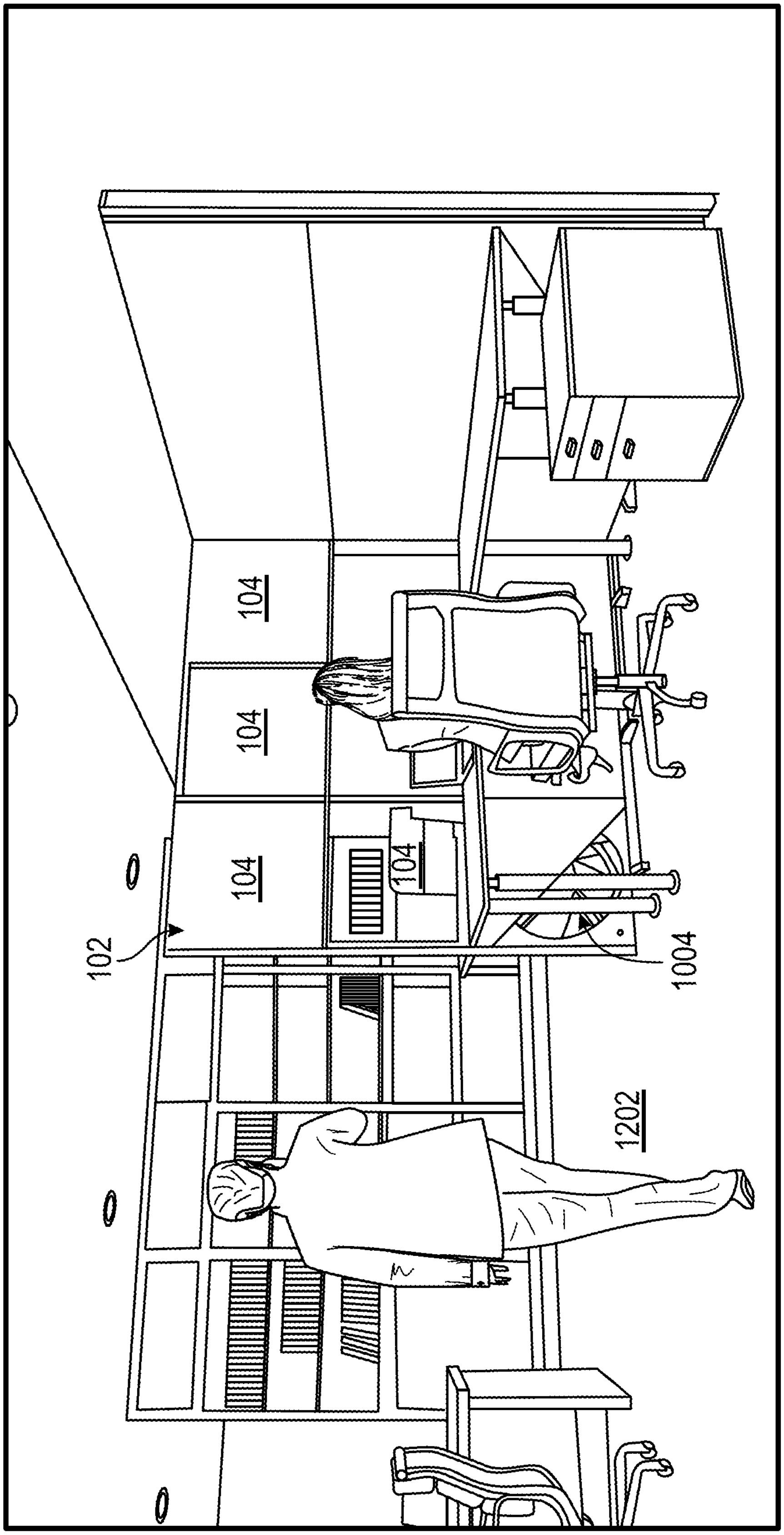
FIG. 12 is a pictorial illustration of a partition wall included in an office setting.

FIG. 12 shows an exemplary embodiment of partition 102 being used in an office space 1202. Accordingly, each partition 102 can be formed to suit the needs of each office or workspace and may include one or more modules 104 that has cover panels 106 (whether clear or opaque), fans 1004, lighting panels 1010, corkboards, whiteboards, chalkboards, writeable calendar boards, and other add-on pieces 504 that may be fitted within or otherwise integrated within the formed module 104*s*. As shown in FIG. 12, the partition 102 can be positioned at right angles and joined together 1002 at right angles or another angle. Further, the partitions 102 can be positioned between desks and shelving and/or other furniture or surfaces that are included in typical office spaces 1202.

In one non-limiting embodiment, multiple partitions 102 (e.g., four) may be positioned next to each other to form the shape of a cubicle workspace. The multiple partitions 102 may be positioned to stand freely next to one another. Alternatively, the multiple partitions 102 may be connectable to one another using one or more fasteners or ties or another connecting tool to provide further stability. Further, if desired, the user may use a tie, fastener, or other tool to attach the partition 102 to an existing wall or other structure (e.g., a desk, table, cabinet) located in the room or other area in which the partition 102 is located.

Any number of partitions 102 may be formed by the user having any number of add-on pieces 504, cover panels 106, and may be arranged in any desired orientation to form the desired workspace for the user to enjoy more privacy and control. The user may benefit from being able to utilize a cork board, white board, calendar, charging portions or any other item located on or integrated within one or more modules 104 in the one or more partitions 102, as well as any lighting panels, fans, or charging ports included in the partition 102.

Figure 13:
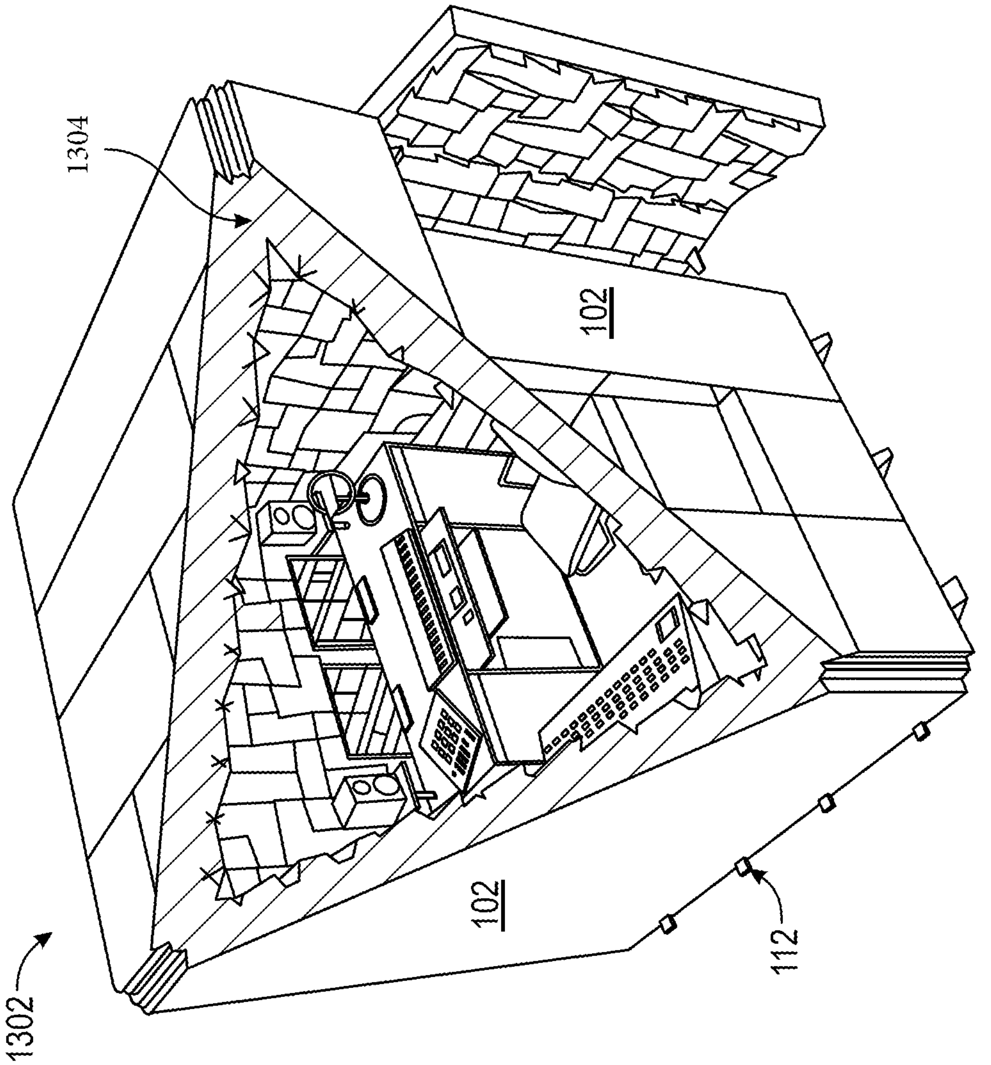
FIG. 13 is a pictorial illustration of a soundproof music recording studio in which one or more partition walls formed from modules is used.

FIG. 13 shows an exemplary soundproofed studio 1302 that can be used to record music, or any type of audio recording that can be created by using the partitions 102 and the formed modules 104. The formed modules 104 may include sound batting 1304 between the interior and outside surfaces of each partition 102 wall used to form the entire studio 1302. The sound batting 1304 can be added as an add-on piece 504 within the interior cavities 318, 740 of each formed module 104 or one or more formed modules 104 in order to provide sound insulation for the studio 1302. Other add-on pieces 504 may also be integrated such as fans 1004 and lighting panels 1010 and/or cover panels 106 if needed.

Figure 14:
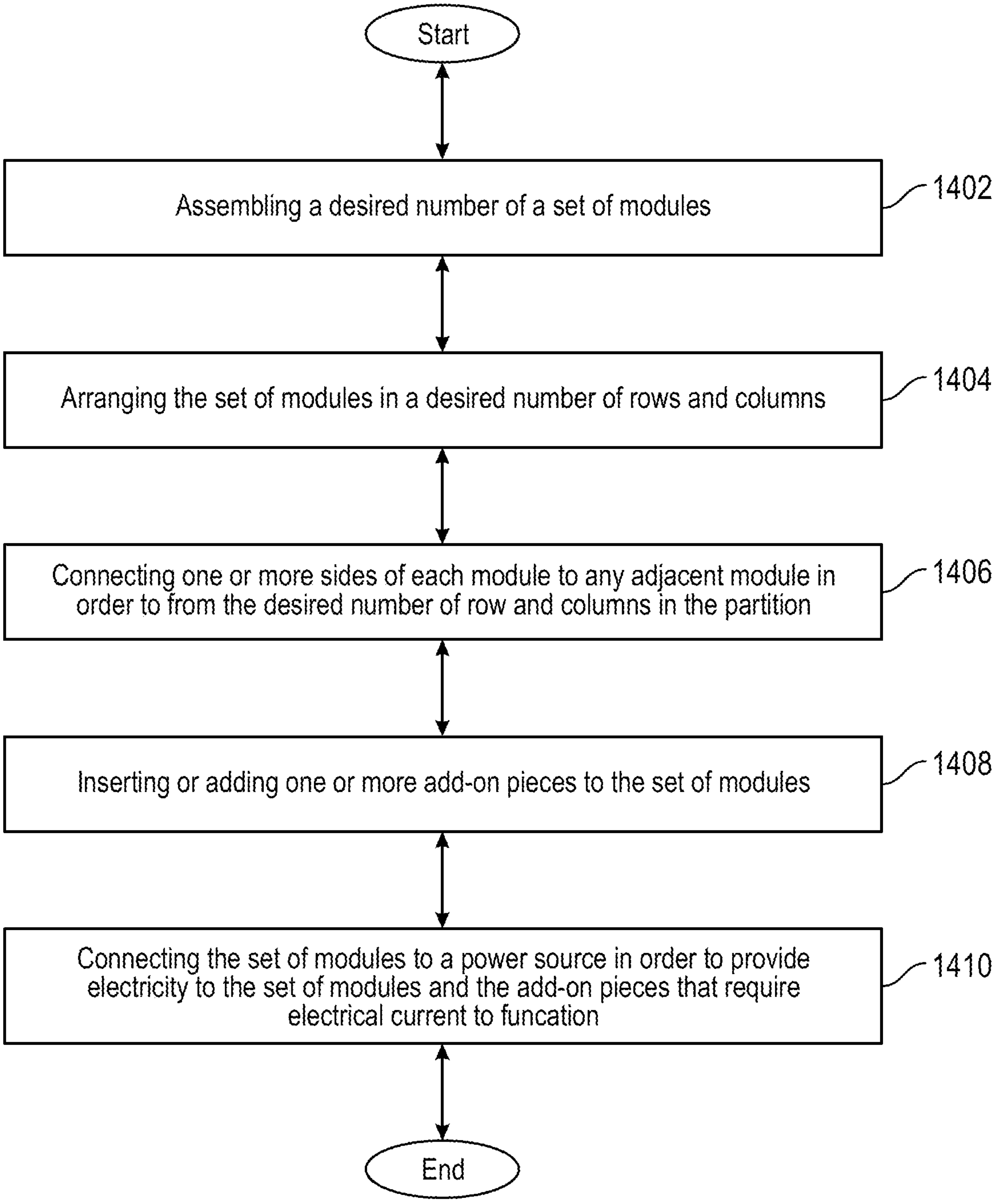
FIG. 14 is an exemplary flowchart for how a partition may be formed using one or more formed modules.

FIG. 14 provides an exemplary method of building a partition 102 according to one or more non-limiting embodiments. In the first step 1402, the method may include assembling a desired number of a set of modules 104. It is noted that these modules 104 may be formed by the user and put together by the user themselves or ordered by a user and assembled by an assembler or another manufacturer.

At step 1404, the set of modules 104 may be arranged into a desired number of rows 114 and columns 116. At step 1406, one or more sides of each module 104 as arranged in a row 114 and/or column 116 may be connected to form the desired number of rows 114 and columns 116 for a partition 102. At step 1408, the one or more add-on pieces 504 may be inserted or added or otherwise fitted within each designated module 104. At step 1410, the set of modules 104 may be connected to a power source in order to provide electricity to the set of modules 104 and the add-on pieces 504 that require electrical current to function. Such add-on pieces 504 may include, but are not limited to, fans to provide cooling air, heaters, lighting panels, charge ports, or any other type of electrically operated device.

Accordingly, the present description provides for various embodiments for a system to build walls or partitions that have multiple design and space options. Many uses and advantages are offered by the system as described above in one or more non-limiting embodiments in the present description.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description but is not intended to be exhaustive or limited to the invention in the form disclosed. Many modifications and variations will be apparent to those of ordinary skill in the art without departing from the scope and spirit of the invention.

The embodiments were chosen and described in order to best explain the principles of the invention and the practical application, and to enable others of ordinary skill in the art to understand the invention for various embodiments with various modifications as are suited to the particular use contemplated. The present invention according to one or more embodiments described in the present description may be practiced with modification and alteration within the spirit and scope of the appended claims. Thus, the description is to be regarded as illustrative instead of restrictive of the present invention.

What is claimed is:

1. A system for building a partition, the system comprising:

a set of rows and columns of a set of modules, wherein each module of the set of modules is rectangular shaped, and wherein each module of the set of modules comprises:

a left inner frame section and a right inner frame section;

a top inner frame section and a bottom inner frame section;

four corner connector pieces, wherein a first corner connector piece connects a first end of the left inner frame section to a first end of the top inner frame section, and a second corner connector piece connects a second end of the top inner frame section to a first end of the right inner frame section, and a third corner connector piece connects a second end of the right inner frame section to a first end of the bottom inner frame section, and a fourth connector piece connects a second end of the bottom inner frame section to the second end of the left inner frame section, such that a rectangle shape is formed;

a left outer frame connection piece, a right outer frame connection piece, a top outer frame connection piece, and a bottom outer frame connection piece, wherein the left outer frame connection piece is connected to the left inner frame section, wherein the top outer frame connection piece is connected to the top inner frame section, wherein the right outer frame connection piece is connected to the right inner frame section, and the bottom outer frame connection piece is connected to the bottom inner frame section; and one or more cover panels wherein the one or more cover panels is configured to attach to a front side or a back side of each module of the set of modules;

wherein each module is configured to connect to an adjacent module;

a set of feet that connect to a bottom row of the partition to stabilize the partition on a floor surface;

one or more add-on pieces, wherein the one or more add-on pieces are configured to fit within an interior cavity or region of each module; and electrical connections to a power source to provide power to the one or more add-on pieces that require electricity to function.

2. The system of claim 1, wherein the one or more cover panels that cover a front panel and/or a back panel of each module.

3. The system of claim 2, wherein the one or more cover panels are opaque.

4. The system of claim 2, wherein the one or more cover panels are transparent.

5. The system of claim 1, wherein the one or more add-on pieces comprise a cork board or a white board.

6. The system of claim 1, wherein the one or more add-on pieces comprise a fan.

7. The system of claim 1, wherein the one or more add-on pieces comprise a light producing panel.

8. The system of claim 1, wherein the partition is a room divider.

9. The system of claim 1, wherein the partition is used to construct a cubicle or other workspace.

10. The system of claim 2, wherein sound batting is attachable to the front panel and/or the back panel of said module to provide sound proofing.

11. A system for building a partition, the system comprising:

one or more modules, wherein each module of the one or more modules is rectangular shaped, and wherein each module of the one or more modules comprises:

a left inner frame section and a right inner frame section;

a top inner frame section and a bottom inner frame section;

four corner connector pieces, wherein a first corner connector piece connects a first end of the left frame inner section to a first end of the top inner frame section, and a second corner connector piece connects a second end of the top inner frame section to a first end of the right inner frame section, and a third corner connector piece connects a second end of the right inner frame section to a first end of the bottom inner frame section, and a fourth connector piece connects a second end of the bottom inner frame section to the second end of the left inner frame section, such that a rectangle shape is formed;

a left outer frame connection piece, a right outer frame connection piece, a top outer frame connection piece, and a bottom outer frame connection piece, wherein the left outer frame connection piece is connected to the left inner frame section, wherein the top outer frame connection piece is connected to the top inner frame section, wherein the right outer frame connection piece is connected to the right inner frame section, and the bottom outer frame connection piece is connected to the bottom inner frame section; and one or more cover panels wherein the one or more cover panels is configured to attach to a front side or a back side of each module of the set of modules; and electrical contact elements, wherein the electrical contact elements are configured to conduct electrical current; and one or more add-on pieces, wherein the one or more add-on pieces are customized to be attached to an interior opening/cavity of each module, wherein the one or more modules are adapted to connect electrically to an electrical source and to conduct electricity to the one or more add-on pieces in order to provide an electrical function associated with the one or more add-on pieces, and wherein each module of the one or more modules is adapted to connect to another module to form the partition.

12. The system of claim 11, wherein the left outer connector piece, the right outer connection piece, the top outer connection piece, and the bottom outer connection piece include apertures, wherein the electrical contact elements are adapted to fit within the apertures of the left outer connector piece, the right outer connection piece, the top outer connection piece, and the bottom outer connection piece.

13. The system of claim 11, wherein the one or more add-on pieces comprise a fan, a light, a cork board, a white board, a fabric covered panel, a transparent panel, a charging port, or soundproofing insulation.

14. The system of claim 11, further comprising, one or more feet that are configured to be attached to a bottom surface of the partition, wherein the one or more feet support the partition in an upright position and provide stability to the partition.

15. The system of claim 11, further comprising, a power cord, wherein the power cord connects the one or more modules to the electrical source.

16. The system of claim 11, wherein the one or more modules are configured to connect to each other on all four sides of the one or more modules.

17. The system of claim 11, wherein one or more partitions formed from the one or more modules are adapted to be positioned adjacent to one another to form a workspace arrangement.

18. The system of claim 17, wherein the one or more partitions are arranged into a cubicle arrangement.

19. The system of claim 17, wherein the one or more partitions are adapted to be removably attached to one another.

* * * * *